United States Patent [19]

Caldwell

[11] 4,040,436
[45] Aug. 9, 1977

[54] MEANS AND METHOD OF IRRIGATION CONTROL

[76] Inventor: Dave L. Caldwell, 28890 Lilac Road, Sp. 110, Valley Center, Calif. 92082

[21] Appl. No.: 603,081

[22] Filed: Aug. 8, 1975

[51] Int. Cl.² ............................................. A01G 25/00
[52] U.S. Cl. .......................................... 137/1; 47/79; 73/194 R; 137/78
[58] Field of Search ...................... 137/78; 239/63, 64; 47/79

[56] References Cited

U.S. PATENT DOCUMENTS

| | | | |
|---|---|---|---|
| 2,674,490 | 4/1954 | Richards | 239/64 |
| 3,910,300 | 10/1975 | Tal | 137/78 |

Primary Examiner—Martin P. Schwadron
Assistant Examiner—Richard Gerard
Attorney, Agent, or Firm—Lyon & Lyon

[57] ABSTRACT

A means and method of irrigation control wherein a porous sensor is placed in the root zone in moisture transfer relation with the soil, and is supplied with air at a pressure sufficient to cause progressively increasing seepage of air through the sensor as soil moisture is lessened, there being means for detecting the rate of seepage of the air utilized to indicate moisture content of the soil for manually or automatically activating a timer for the irrigation system; the irrigation control further including the use of several sensors placed at different soil levels, as well as a warning sensor adapted to be activated should the soil start to become drier than its normal relatively moist condition.

An embodiment utilizes one or more selected plants with corresponding sensors as a means of detecting sudden weather changes to anticipate changes in ground moisture. A further embodiment utilizes an evaporation measuring means designed to detect incipient change in humidity indicative of sudden weather change.

27 Claims, 10 Drawing Figures

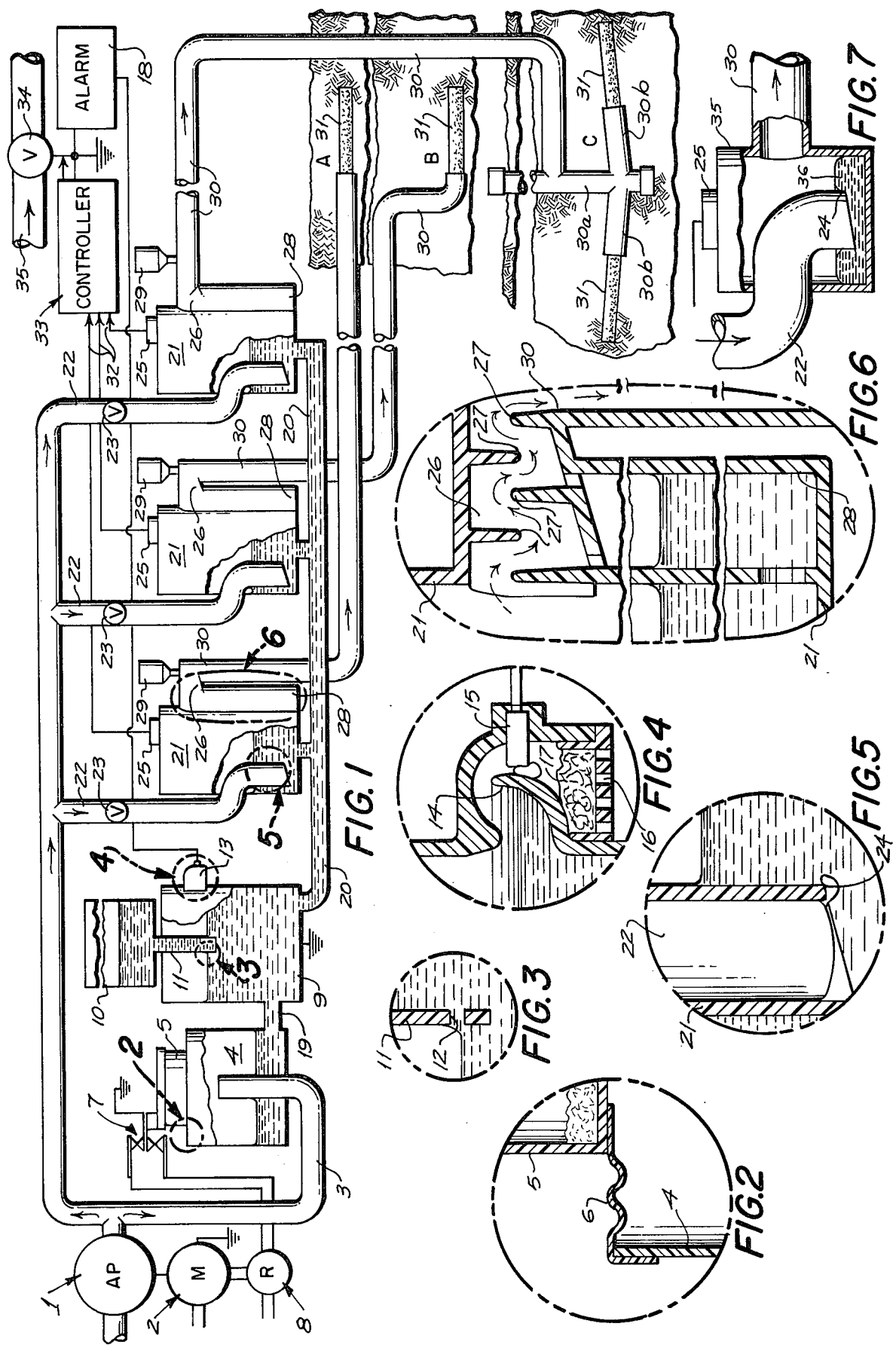

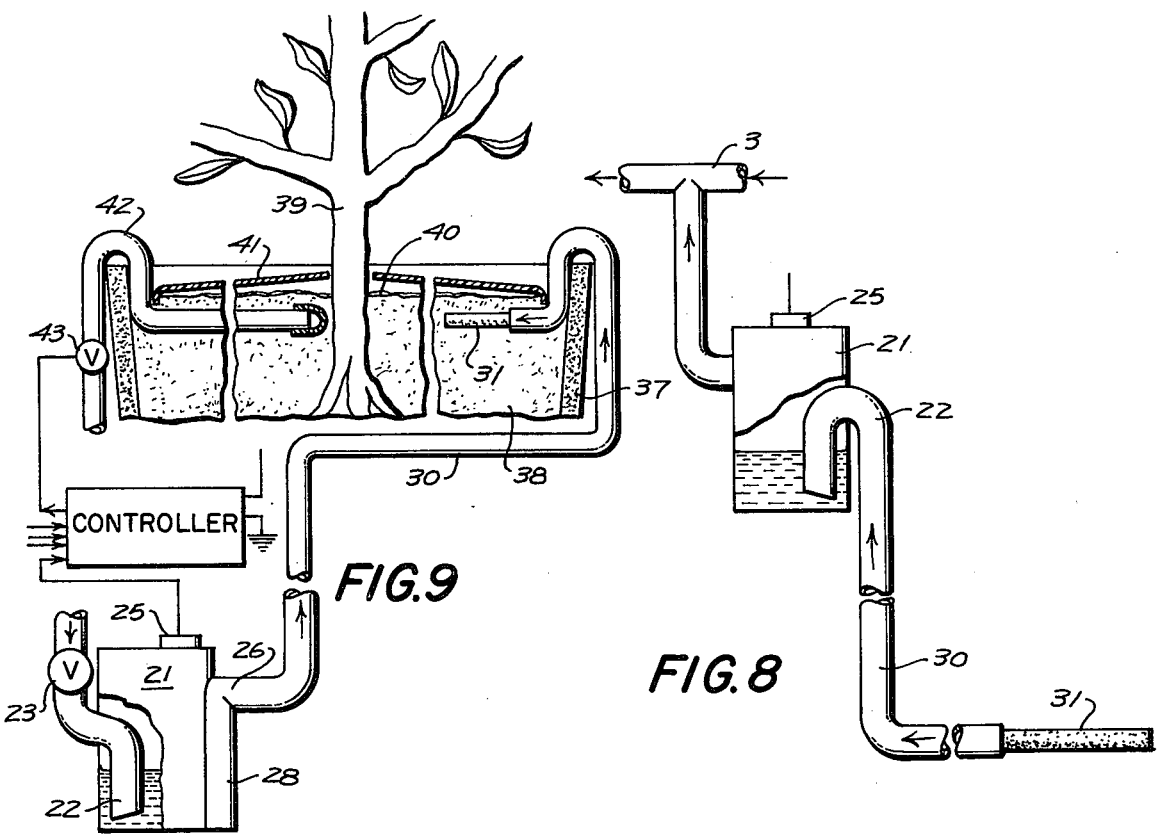
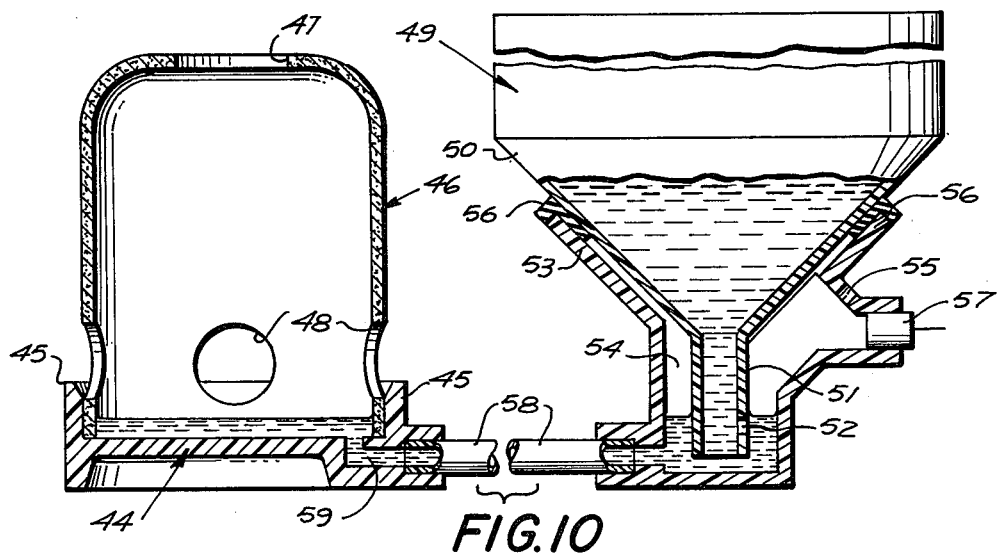

MEANS AND METHOD OF IRRIGATION CONTROL

BACKGROUND OF THE INVENTION

For many years soil moisture content has been measured by a device, known as a tensiometer which measures the surface tension of the water in a capillary state. A typical tensionmeter is disclosed in U.S. Pat. No. 2,878,671. Tensiometers include a tubular porous ceramic sensor or bulb closed at one end and sealed at its open end to a tube which is usually provided at its upper end with a transparent sight tube closed by a sealing cap. The tube is connected to a vacuum gauge or mercury monometer. In use, the tensiometer is filled with water and the sensor is placed in a carefully prepared opening in the ground, so as to obtain a snug contact between the sensor and the soil. Often two or three tensiometers are placed with their sensors at different depths. When the soil is saturated, all pore space filled with water, the vacuum gauge will indicate essentially atmospheric pressure which is zero gauge, or 760 mm Hg absolute pressure. As the soil moisture is reduced, the capillary dimensioned water particules tend to move into the pores of both the sensor and the soil; however their surface tension will resist and produce a subatmospheric pressure in the tensiometer indicator on the gauge. As the soil moisture lowers, the moisture seals will progressively open and permit some air to enter the tensiometer. Once this occurs, the expansible character of air renders the tensiometer inaccurate, hence, the provision of a sight tube to detect air. Hence, the provision of a cap for removal to replace air with water.

A plant watering device utilizing a ceramic sensor similar to the tensiometer sensor which has met with success is shown in U.S. Pat. No. 3,758,987. In this case, the porosity is such that air is permitted to pass through the sensor at a sub-atmospheric pressure to partially relieve a vacuum created in a sealed water reservoir. However, the flow of air from the soil through the sensor wall tends to carry minute matter which tends to cloq the sensor. When the soil becomes saturated, as during a heavy rain or excessive irrigation, water is drawn through the sensor, thereby blocking the flow of air through the small tubing connected to the sensor and rendering the device inoperative.

SUMMARY

The present invention is directed to a means and method of irrigation control, which overcomes the disadvantages of previous attempts to utilize a porous ceramic sensor, and is summarized in the following objects:

First, to provide a means and method of irrigation control which utilizes a porous cell moisture sensor placed in the soil, a closed air supply system for causing seepage of air outwardly through the sensor and a means for accurately measuring the rate and volume of air seepage capable of causing the operation of appropriate valves to control irrigation.

Second, to provide a means and method of irrigation control as indicated in the preceeding object, which incorporates a novel measuring means wherein air flowing to the sensor for seepage therethrough is caused to bubble through a liquid and each bubble is detected to determine the rate and volume of flow.

Third, to provide a means and method of irrigation control wherein the irrigation system may be divided into several units and a corresponding set of controls are linked to by air supply tube sensors in each irrigation unit for individual control.

Fourth, to provide a means and methods of irrigation control wherein sensors may be placed at different levels in the root zone and the information received therefrom may be combined to improve response of the irrigation system to soil moisture conditions; and which may further include deeply placed sensors serving to produce a warning of impending excessive water reduction, should the sensors normally used fail to initiate irrigation.

Fifth, to provide a means and method of irrigation control as indicated in the preceeding objects which may utilize selected evergreen plants within the irrigation system or plants located in separate clay pots, each plant having a sensor so placed as to respond rapidly to changes in water demands from the plant as occasioned by weather change, such weather sensitive sensors connected to an irrigation control station common to the other sensors to override the other sensors, if for example, the area under irrigation is subjected to hot dry winds.

Sixth, to provide a means and method of irrigation control which utilizes a novelly arranged evaporation measuring means which more quickly detects incipient change in humidity and temperature than the presently utilized means of detection.

Seventh, to provide a means and method of irrigation control utilizing the flow of air through porous sensor elements which may be arranged to measure flow at a preselected positive pressure or negative pressure.

DESCRIPTION OF THE FIGURES

FIG. 1 is a diagrammatical view showing one embodiment of the means for irrigation control utilizing air flow at a predetermined positive pressure.

FIGS. 2, 3, 4, 5 and 6 are enlarged sectional views taken respectively within circles 2, 3, 4, 5 and 6 of FIG. 1.

FIG. 7 is an enlarged fragmentary diagrammatical view showing a further embodiment of a means for detecting air flow.

FIG. 8 is a fragmentary diagrammatical view of another embodiment for detection of air flow at a preselected negative pressure.

FIG. 9 is a fragmentary sectional view showing a plant and a container therefore and including elements of the means of irrigation control arranged particularly to sense weather conditions.

FIG. 10 is a diagrammatical view showing an embodiment of the means of irrigation control utilizing an evaporation measuring means.

DESCRIPTION OF THE PREFERRED EMBODIMENTS

Reference is first directed to FIGS. 1 through 6. The embodiment here illustrated includes an air pump or blower 1 driven by a motor 2 for supplying air to an air tube 3. The capacity of the air pump may be quite small as the total volume of air required may be less than a cubic foot per hour.

One branch of the air tube is directed into an air storage and pressure tank 4 on top of which is mounted a ballast container 5 supported by a diaphram 6 as shown in FIG. 2. Movement of the ballast container 5 is utilized to operate a switch 7 which may be employed directly to control the motor 2 or may effect such control to a relay 8. The weight of the ballast container determines the pressure maintained in the tank 4.

The diameter of spout 11 must be sufficient to permit the outward flow of the air bubbles from said side opening 12 without too much interference with the downward flow of water within said spout. This interference could be eliminated by utilizing the water level control, illustrated in FIG. 10.

Disposed in contiguous relation to the air storage and pressure tank 4, is a water level control tank 9 above which is mounted a water reservoir 10 having a depending spout 11 submerged in the water contained in the tank 9 and provided with a side opening 12 as shown in FIG. 3.

The water level control tank 9 is provided with an overflow outlet 13 having a dirp lip 14 and an electrode 15 overlying a vent 16 provided with a fiberous pad 17 as shown in FIG. 4. The electrode is connected to an alarm 18 shown at the far right of FIG. 1 or other warning device to indicate that water in the tank 9 has exceeded the desired heights, when a drop of water momentarily grounds the circuit through the electrode 15.

The water level control tank 9 is connected to the air storage and pressure tank 4 by passage 19. Air pressure in the tank 4 maintains its liquid level at a predetermined distance below the water level in the tank 9. It will be brought out later that the air is preferably maintained at a pressure slightly above atmospheric pressure, in the order of approximately 1 inch of water "head". The water level control tank 9 is connected by a passage 20 to a series of bubbler tanks 21, three such tanks being illustrated.

The air tube 3 is provided with a branch line 22 for each bubbler tank 21. Each branch line 22 is provided with a throttling valve 23. The branch lines extend downwardly and their lower ends terminate within the corresponding bubbler tanks 21 to form bubble outlets 24 as shown in FIG. 5. Suitably mounted on each tank 21 is a bubble detector 25 which may be a small microphone capable of detecting the sound of a bubble as it bursts from the outlet 24 before rising to the surface of the liquid in the bubble tank. While a microphone is preferred, it should be noted that the bursting of the bubble at the outlet or movement of a bubble may be detected electrically by an electrode or by sight using a conventional sighting device.

Each bubble tank is provided with a discharge passage 26 having moisture baffles 27 so that any water entrained in the air may fall into a return sump 28 as shown in FIG. 6 which may contain fiberous material so that the sound of returning drops of water are not confused with the bursting incoming bubbles. In addition, each discharge passage 26 may be provided with a dessicant container 29 as shown in FIG. 1 to further reduce the moisture content of the air as it leaves the discharge passage 26. Each discharge passage is connected to a sensor supply tube 30.

Each sensor supply line 30 is connected to a sensor 31. Each sensor is in the form of a porous tube closed at one end, formed of capillary material such as clay ceramics, porous plastics, porous fiberous material or the like. Optionally, the sensor may be a solid ceramic cylinder. The particle size as well as the overall size of the sensor itself may approximately correspond to the conventional size of the porous cell provided in a tensiometer such as indicated in the previously identified patents.

The sensors are placed at root zones of different depths. The root zone A defines the shallow or upper part of the root system and the sensors placed therein are subject to the most rapid soil moisture changes between irrigation periods. The root zone B defines the intermediate part of the root system and sensors placed therein are subject to slower soil moisture changes between irrigation periods. The root zone C defines the lower part of the root system and the sensors placed therein are subject to minimal soil moisture change between irrigation periods. Ideally, almost no moisture change occurs in root-zone C between successive irrigations.

It is preferred to provide several sensors 31 in the C zone connected to a single line or tube 30, the purpose being to better detect any lessening of moisture under a wider area, and if so detected, to operate a warning signal. Also it is desirable that the supply tube for the sensors in the C zone be connected to a vertical tube 30a having an exposed and capped upper end. Also, the distributor tubes 30b are upwardly inclined toward their respective sensors 31. This arrangement of tubes 30a and 30b is to provide a sump for collection of water that may interfere with movement of air to the sensors and to provide access so that a small suction tube could be inserted to remove any collected water.

The sensors are in contact with the surrounding soil so that the moisture content of the porous sensor walls correspond to the moisture of the surrounding soil, that is, when the soil is saturated, the pores of the sensors are likewise saturated. Then as the soil moisture lessens the sensors gradually lose their moisture until equalibrium is established in the surface-tension forces in the soil and sensors.

When the sensors are completely saturated, the water which is divided in particles of capillary size have a surface tension which must be overcome in order for air to pass through the sensor.

A pore size is selected which when the sensor is saturated will stand an air pressure approximately equal to one inch of water with practically no movement of air through the sensor. As the surrounding soil moisture diminishes, air will begin to seep through the sensor ranging from one bubble or less per hour to 60 to 120 bubbles per minute. Thus, a wide range of air flow may occur which can be easily counted, or recorded.

As mentioned above, the soil in zone A loses moisture more rapidly than the soil in the zone B. By utilizing the rates of air seepage in these two zones, a timer in the controller may be set for starting and stopping the succeeding irrigation cycle.

Should the sensors in the zones A and B fail to function and thus fail to maintain adequate moisture therein, the sensors in zone C activate an alarm or warning signal indicating that the control system should be checked.

While in the embodiment shown in FIGS. 1 through 6 water is indicated as the liquid through which the air is bubbled, it should be noted that other liquids having a lower evaporation rate or misting rate or foaming rate than water, may be utilized. Also, while it is convenient to use air, other gases may be used as the volume required is quite small.

As indicated previously, the size of the control means may be quite small, that is, the bubblers may have a capacity in the order of a half cubic inch or so. If water is used, the air tubes should be large enough (in the order of ⅜ of an inch in diameter) to prevent closure by water drops that may condense in the air line. The lengths of the tubes may however, be substantial. In fact, the distance between the bubblers and the sensors may be in the order of several hundred feet.

The means of irrigation control may be reduced materially in size by utilizing mercury in place of water. In this regard, reference is directed to FIG. 7, which illustrates a bubbler tank 35 containing a layer of mercury 36 in which a branch line 22 extends and from which air bubbles through the mercury to be detected by a microphone detector 25. Tests have indicated that a quantity of mercury approximating one-fourth of a cubic centimeter is adequate.

It is preferred to subject the air to a low, but positive pressure for outward flow through the sensors. However, the system may be operated in reverse; that is, by a preselected negative pressure to cause the air to enter through the sensors. This may be accomplished, as shown in FIG. 8, by reversing flow through each bubbler tank 21. That is the branch line 22 is connected through a tube 30 to a corresponding sensor, while the outlet from the bubbler tank is connected to the line 3. If a blower is used to produce a vacuum, the line 3 is connected to the intake of the blower in place of the outlet.

If mercury or other liquid is used which does not require replacement, each bubble tank 21 or 35 may be isolated from the other bubble tanks.

While in FIGS. 1 through 6, a single control is indicated operating a central valve 34, (FIG. 1) it should be understood that the irrigation system may be of such an extent that several valves 34 are needed. In fact, several independent control units may be provided for different sections of an irrigation system. These may have a common air supply line, also it should be noted that the volume of air or other gas required is sufficiently low that the air or gas such as nitrogen may be supplied from a central pressure tank providing of course, that the final pressure is maintained at the desired level.

A frequent problem in the operation of irrigation system is to recognize and respond to atmospheric conditions before soil moisture conditions indicate that irrigation is needed. For example, should a sudden hot spell occur coupled with low humidity and wind, irrigation should be initiated prior to the scheduled time. Information concerning such conditions are normally obtained from weather reports or from visual observation and the irrigation system is activated manually. Physical examination of the crop is often inadequate for this purpose. It is possible, however, to provide a signal from an evaporation sensing means and supply such signal to the controller.

Referring to FIG. 9, there is illustrated a weather sensing unit which comprises a porous plant pot 37 preferably containing sandy gravel 38 forming a soil or planting medium having low lateral permeability but relatively high vertical permeability. The root system of an evergreen plant 39 is contained in the pot. While many plants are satisfactory, a plant requiring minimal care is preferred, for example: Tamarisk, Monterey Pine and Cypress.

A sensor 31 is placed immediately adjacent the surface level of the soil and the soil covered with a mulch 40 having good lateral permeability for example, vermiculite or pulverized mica. A shield 41 such as a plastic disk is placed over the mulch and around the trunk of the plant so as to protect the sensor from direct exposure to the atmosphere.

The sensor 31 is connected to a bubbler tank 21 through a supply tube 30 as previously described. The plant is isolated from the irrigation system in that it is provided with a separate water supply tube 42 having a control valve 43. The control valve is activated by the controller 33.

The method of irrigation control includes the utilization of the plant 39 as a means of sensing weather conditions if the plant is subjected to low humidity, high temperature and possibly in addition dry winds, the plant's uptake of water is greatly increased, and quickly sensed by the sensor 31 in the pot 37 substantially before the effect of such weather conditions would be sensed by the normally used in zones A and B. In utilizing a plant as a weather sensor, it is preferred to use two plants of different size. In addition, a still smaller plant may be grown so that periodically a second plant may be substituted for the first plant and the third plant be substituted for the second plant.

Essentially the plants 39 function as evaporation meters. Referring to FIG. 10, an evaporation meter is illustrated. Such a meter includes an evaporator having a base member 44 surrounded by a rim 45 in which is set an inverted shell 46 formed of porous ceramic or porous plastic material and provided with a top vent 47 and side vents 48. Means, not shown, secure the shell in place.

Water is maintained at a shallow depth in the base member 44 by a water supply including a vacuum tank 49. The tank has a conical lower portion 50 terminating in an outlet tube 51 having a small side opening 52 for admission of air. The lower portion of the tank rests in a conical support 53 including a chamber 54 surrounding the outlet tube 51. The chamber is sealed, except for an air inlet 55, by a gasket 56 interposed between the support 53 and conical portion 50. The chamber 54 is provided with a bubble detector such as a microphone 57. The chamber 54 and base member 44 are connected through a tube 58 and inlet passage 59 in the bottom of the base member. The constant level of the water in the evaporator is maintained at the level of the side opening 52.

Operation is as follows:

The evaporator is located in an exposed place where air may enter and exit through the vents 47 and 48. As water is evaporated, air enters the tank 49 through the port 52 forming a series of bubbles which displaces water under sub-atmospheric pressure (vacuum) in the tank 49. Formation of the bubbles is detected by the microphone 57. A rapid increase in bubble formation indicates an excessively dry and hot weather condition. Such signal is utilized to initiate irrigation prior to its scheduled time.

Having fully described my invention it is to be understood that I am not to be limited to the details herein set forth, but that my invention is of the full scope of the appended claims.

I claim:

1. A means for indicating soil moisture condition, comprising:
    a. a sensor having a porous wall adapted when in moisture contact with soil to maintain a moisture content corresponding approximately to the moisture content of the soil;
    b. a gas line connected to the sensor;
    c. means for maintaining the gas in the gas line and sensor at a pressure to cause an increased seepage of gas through the sensor wall as the water content of the sensor wall and soil is lowered;

d. and means for measuring the seepage rate of the gas through the sensor to indicate the soil moisture condition.

2. An indicating means as defined in claim 1, wherein:
a. the pressure maintaining means produces a preselected positive pressure to cause outward seepage of gas through the sensor.

3. An indicating means as defined in claim 1, wherein:
a. the pressure maintaining means produces a preselected negative pressure to cause inward seepage of air through the sensor.

4. An indicating means as defined in claim 1, wherein:
a. a closed chamber containing a liquid is interposed in the gas line;
b. the gas line is provided with a discharge port disposed below the liquid level and an intake port disposed above the liquid level, whereby the gas bubbles through the liquid;
c. and the measuring means senses and counts the bubbles passing through the liquid.

5. An indicating means as defined in claim 1, wherein:
a. a plurality of sensors and gas tubes are provided;
b. a plurality of interconnected chambers forming a closed system having a common source of liquid partially filling each chamber is provided and a chamber is interposed in each gas line;
c. each gas line includes a discharge port submerged in the liquid in a corresponding chamber and an intake port above the liquid therein;
d. and the measuring means includes a counter sensitive to the gas bubbles passing through the liquid in each chamber.

6. An indicating means as defined in claim 1, wherein:
a. means is provided to cause the gas to bubble through a liquid;
b. and the measuring means is a bubble counter.

7. An indicating means as defined in claim 6, wherein:
a. the liquid is water;
b. means is provided to maintain a supply of water;
c. and means is provided to minimize the water content of the gas passing into the gas tube.

8. An indicating means as defined in claim 6, wherein:
a. the liquid and gas are essentially immiscible.

9. An indicating means as defined in claim 1, wherein:
a. a plurality of indicating means, each including a sensor, gas tube and measuring means is provided, at least one sensor being located in an upper portion of the root zone of the soil surface, at least one sensor being located in an intermediate portion of the root zone and at least one sensor being located in a lower portion of the root zone.

10. A means for controlling an irrigation system having timer and valve means for activating and deactivating an irrigation cycle, comprising:
a. at least one moisture sensor having a porous wall adapted, when in moisture contact with soil to maintain a moisture content within said porous wall corresponding approximately to the moisture content of the soil;
b. a gas supply line connected to the moisture sensor;
c. means for maintaining the gas in the gas supply line and moisture sensor at a pressure to cause seepage of gas through the sensor wall as the water content of the seepage sensor wall and soil is lessened, the porosity of the wall and the gas pressure being such as to reduce seepage of air through the sensor as the soil moisture increases;
d. means for detecting seepage of the gas;
e. and control means responsive to the seepage detecting means for activating the irrigation timer and valve means when the soil moisture has been lessened a predetermined amount.

11. A control means as defined in claim 10, which further comprises:
a. an atmospheric change sensing means including soil adapted to receive a selected plant exposed to atmospheric changes, a second moisture sensor disposed adjacent the surface of the soil contiguous to the plant, means for protecting the second sensor from direct exposure to atmospheric change; a gas supply line, gas pressure maintaining means, seepage detecting means, control means and a water supply line having a valve for said plant, whereby said second moisture sensor is subject to the changes in water demand unique to said plant as determined by the atmospheric changes to which the plant is exposed.

12. A control means, as defined in claim 10, wherein:
a. the seepage detecting means includes a liquid container interposed in the gas line to cause the gas to bubble in sequence therethrough and means for counting the bubbles to produce signals in proportion to the rate of seepage of gas through the moisture sensor wall.

13. A control means, as defined in claim 10, wherein:
a. the gas pressure maintaining means includes a gas pump, and a closed tank connected to the gas line and having a weighted cover movable with change in gas pressure, and a control means actuated by movement of the cover to turn the gas pump on and off.

14. A control means, as defined in claim 10, wherein:
a. a set of moisture sensors and corresponding sets of gas lines and seepage detecting means are provided, the seepage detecting means including a set of closed tanks, each tank interposed in a corresponding gas line and having an inlet under the liquid level therein and an outlet above the liquid level therein whereby the gas produces bubbles in passing from the inlet to the outlet;
b. and the control means includes a counter for the bubbles passing through the liquid in each tank.

15. A control means, as defined in claim 14, wherein:
a. the set of tanks are connected to a common source of liquid supply including means for maintaining a predetermined level of liquid in each tank.

16. A control means, as defined in claim 15, wherein:
a. the gas is air and the liquid is water.

17. A control means, as defined in claim 15, wherein:
a. the liquid is mercury.

18. A control means, as defined in claim 10 which further comprises:
a. means for detecting incipient adverse change in weather prior to said predetermined lessening of soil moisture.

19. A control means, as defined in claim 18, wherein, the detecting means includes:
a. a pot having porous walls adapted to receive a plant and porous soil therein, a sensor adjacent the surface of the soil and means for supplying water to the pot, the pot being placed in full exposure to atmospheric condition, b. and means for measuring the rate of evaporation from the soil.

20. A control means as defined in claim 18 wherein, the detecting means includes:
   a. an evaporator exposed to atmospheric conditions and having a surface adapted to be covered with water;
   b. means for supplying the evaporator with water as the water is evaporated therefrom;
   c. and means for measuring the rate of evaporation.

21. A method of irrigation control utilizing a sensor having a porous wall adapted, when in moisture contact with soil, to maintain a moisture content approximately corresponding to the moisture content of the soil, the porous wall being saturated when the moisture in the soil is at saturation, the method characterized by:
   a. placing at least one sensor in moisture contact with soil;
   b. supplying to the sensor a gas at a pressure to cause increased seepage of the gas through the porous wall as the moisture content of the porous sensor wall and the soil is reduced;
   c. and measuring the rate of seepage flow of gas to determine the moisture content of the soil.

22. A method of irrigation control, as defined in claim 21, wherein:
   a. the gas is supplied at a preselected positive pressure to cause outward seepage through the porous wall.

23. A method of irrigation control, as defined in claim 22, wherein:
   a. the gas is air and is maintained at a preselected negative pressure to cause inward seepage through the porous wall.

24. A method of irrigation control, as defined in claim 21, which is further characterized by:
   a. bubbling the gas flowing to the sensor through a liquid; and measuring the rate of seepage flow by counting the bubbles as produced in the liquid.

25. A method of irrigation control as defined in claim 21 which is further characterized by:
   a. utilizing the measurement of the seepage rate to activate or deactivate an irrigation cycle.

26. A method of irrigation control, as defined in claim 21, which is further characterized by:
   a. placing one of said sensors adjacent a selected plant and contiguous to the surface of the soil whereby said sensor is responsive to the moisture content of the plant as indicatd by the corresponding moisture in the adjacent soil;
   b. measuring the seepage through the wall of said sensor to indicate change in the atmospheric conditions affecting said plant;
   c. and utilizing such measurement to override the indications produced by the other sensors to effect early activation of the irrigation cycle.

27. A method of irrigation control as defined in claim 21, which is further characterized by:
   a. placing a first sensor near the surface of the soil;
   b. placing a second sensor within the major root zone;
   c. placing a third sensor in the lower region of the major root-zone that normally remains constantly moist;
   d. primarily activating or deactivating an irrigation cycle in response to measurements related to the first and second sensors;
   e. and producing a warning signal in response to measurements relating to the third sensor.

* * * * *